US007532907B2

(12) United States Patent
Louks et al.

(10) Patent No.: US 7,532,907 B2
(45) Date of Patent: May 12, 2009

(54) METHOD OF PROVIDING MULTIPLE DATA PATHS USING A MOBILE TERMINAL AND RELATED DEVICES

(75) Inventors: Ronald A. Louks, Durham, NC (US); Nadi S. Findikli, Cary, NC (US); Gerard J. Hayes, Wake Forest, NC (US)

(73) Assignee: Sony Ericsson Mobile Communication AB, Lund (SE)

( * ) Notice: Subject to any disclaimer, the term of this patent is extended or adjusted under 35 U.S.C. 154(b) by 460 days.

(21) Appl. No.: 11/199,970

(22) Filed: Aug. 9, 2005

(65) Prior Publication Data
US 2006/0135206 A1 Jun. 22, 2006

Related U.S. Application Data

(60) Provisional application No. 60/638,517, filed on Dec. 22, 2004.

(51) Int. Cl.
*H04B 1/38* (2006.01)
(52) U.S. Cl. .................. 455/550.1; 455/552.1
(58) Field of Classification Search ........ None
See application file for complete search history.

(56) References Cited

U.S. PATENT DOCUMENTS

| 6,216,158 | B1 | 4/2001 | Luo et al. | |
|---|---|---|---|---|
| 6,950,655 | B2* | 9/2005 | Hunkeler | 455/426.1 |
| 2001/0037509 | A1 | 11/2001 | Kligman | |
| 2003/0169287 | A1 | 9/2003 | Liu | |
| 2004/0023650 | A1 | 2/2004 | Ohta et al. | |
| 2005/0272466 | A1* | 12/2005 | Haverinen et al. | 455/552.1 |

FOREIGN PATENT DOCUMENTS

| EP | 1 235 387 | 8/2002 |
|---|---|---|
| WO | WO 92/02084 | 2/1992 |
| WO | WO 03/055246 | 7/2003 |

OTHER PUBLICATIONS

Sallesh Rathi; "Blue Tooth Protocol Architecture", Dedicated Systems Magazine 00q4 on Embedded Internet, www.dedicated-systems.com/magazine/00qr/rtm004big.html 2000, pp. 28-33. Mar. 26, 2002.
3G Tutorial, UMTS overview; Overview of the Universal Mobile Telecommunication System (DRAFT, Jul. 2002) www.umtsworld.com/technology/overview.htm. Jul. 2002.

(Continued)

*Primary Examiner*—Thanh C Le
(74) *Attorney, Agent, or Firm*—Myers Bigel Sibley & Sajovec P.A.

(57) ABSTRACT

A mobile terminal may include a wireless modem, a wireless network interface, and an application (such as a browser application). A method of operating the mobile terminal may include providing a first data path between a data network and the application of the mobile terminal through the wireless modem. In addition, a second data path may be provided between the data network and second mobile terminal through the wireless modem and the wireless network interface of the first mobile terminal. Related devices are also discussed.

27 Claims, 2 Drawing Sheets

OTHER PUBLICATIONS

What is PLMN?—A Word Definition from the Webopedia Computer Dictionary, www.webopedia.com/TERM/P/PLMN.html. Jan. 2, 2004.

Wireless Pocket Access Point —Router—Wireless Client High - Speed 2.4GHz (892.11g) Pocket Router/AP™, www.dlink.com/products/?pid=346. Sep. 22, 2004.

RCR Wireless News, http://rcrnews.com/cgi-bin/news.pl?newsID=19676. Sep. 20, 2004.

Wireless Developer Network "Rysavy Research Report Validates EDGE and UMTS Data Capabilities and Throughput Performance" www.wirelessdevnet.com/news/2004/sep/20/news3.html. Sep. 20, 2004.

Erasala et al; *Bluetooth technology: a strategic analysis of its role in global 3G wireless communication era;* Computer Standards & Interfaces 24 (2002) pp. 192-206. Feb. 25, 2002.

Nakao et al; *Constructing end-to-end paths for playing media objects;* Computer Networks 38 (2002) pp. 373-389. 2002.

International Search Report and Written Opinion for PCT/US2004/007162. Jun. 8, 2004.

Despande et al. "GPRS—How Does It Work and How Good Is It?" *Intel DeveloperUPDATEMagazine*, pp. 1-5 (Oct. 2002).

International Search Report and Written Opinion for PCT/US2005/045026, mailed May. 17, 2006.

\* cited by examiner

METHOD OF PROVIDING MULTIPLE DATA PATHS USING A MOBILE TERMINAL AND RELATED DEVICES

RELATED APPLICATION

This application claims the benefit of priority from U.S. Provisional Application No. 60/638,517, filed on Dec. 22, 2004, the disclosure of which is hereby incorporated herein in its entirety by reference.

FIELD OF THE INVENTION

The present invention relates to the field of data networking, and more particularly, to methods of networking mobile terminals and related devices.

BACKGROUND OF THE INVENTION

A mobile terminal such as a laptop computer, a notebook computer, a handheld computer using an operating system such as Microsoft Windows CE, a personal digital assistant using an operating system such as Palm OS, and/or a smartphone radiotelephone may provide wireless internet browsing functionality. For example, a mobile terminal may be wirelessly linked to the Internet through a public land mobile network (PLMN) such as a cellular radiotelephone network. More particularly, a mobile terminal may be linked to the Internet through the PLMN using a packet switched connection such as that provided by the Enhanced Data GSM Environment (EDGE) standard, the General Packet Radio Service (GPRS) standard, the Universal Mobile Telecommunications System (UMTS) standard, the High Speed Downlink Packet Access (HSDPA) standard, the Code Division Multiple Access (CDMA) standard, and/or the 1x Evolution Data Optimized (1xEVDO) standard.

A mobile terminal providing wireless Internet access may thus be equipped with a transceiver configured for communication with the PLMN and/or a wireless modem. Moreover, a data access account for the PLMN may need to be provided for the mobile terminal. More particularly, separate wireless modems, PLMN transceivers, and/or data access accounts may need to be provided for each mobile terminal configured to provide wireless Internet access.

SUMMARY

According to embodiments of the present invention, a first mobile terminal may include a wireless modem, a wireless network interface, and an application (such as a browser application). Methods of operating the first mobile terminal may include providing a first data path between a data network and the application of the first mobile terminal through the wireless modem. Moreover, a second data path may be provided between the data network and a second mobile terminal through the wireless modem and the wireless network interface of the first mobile terminal. In addition, a third data path may be provided between the data network and a third mobile terminal through the wireless modem and the wireless network interface of the first mobile terminal.

Providing the second data path may also include providing a list of at least one permitted authentication at the first mobile terminal, receiving authentication information from the second mobile terminal, and then providing the second data path between the data network and the second mobile terminal if the authentication is successful. In the alternative, the second data path between the data network and the second mobile terminal may be blocked if the authentication is unsuccessful. More particularly, providing a list of at least one permitted authentication may include accepting user entry of a permitted authentication code through a user interface of the first mobile terminal. In addition, providing a list of at least one permitted authentication may include storing the list of at least one permitted authentication in memory of the first mobile terminal.

More particularly, providing the second data path may also include providing a list of at least one permitted authentication code at the first mobile terminal, receiving an authentication code from the second mobile terminal, and then providing the second data path between the data network and the second mobile terminal if the authentication code matches one of the list of at least one permitted authentication code. In the alternative, the second data path between the data network and the second mobile terminal may be blocked if the authentication code does not match any of the list of at least one permitted authentication code. More particularly, providing a list of at least one permitted authentication code may include accepting user entry of a permitted authentication code through a user interface of the first mobile terminal. In addition, providing a list of at least one permitted authentication code may include storing the list of at least one permitted authentication code in memory of the first mobile terminal.

The first and second data paths may be provided at the same time, and the data network may be the Internet. Moreover, the wireless network interface may be a wireless local network interface such as a wireless local network interface operating according to at least one of a WiFi standard, a Bluetooth standard, a radio frequency identification (RFID) standard, a Zigbee standard, and/or a WiMax standard.

The wireless modem may provide a data connection with the data network using a public land mobile network (PLMN), and the wireless modem may provide the data connection using the public land mobile network according to at least one of a Global System For Communications (GSM) standard, an Enhanced Data GSM Environment (EDGE) standard, a General Packet Radio Service (GPRS) standard, a Universal Mobile (UMTS) standard, a High Speed Downlink Packet Access (HSDPA) standard, a Code Division Multiple Access (CDMA) standard, a 1x Evolution Data Optimized (1xEVDO) standard, a WiFi standard, an Ultra Wide-Band standard, a WiMax standard, and/or a Wide-Band Code Division Multiple Access (WCDMA) standard. More generally, the wireless modem may provide the data connection using the public land mobile network and a packet switched connection and/or a circuit switched connection. In addition, a voice radiotelephone communication may be provided by the first mobile terminal using the public land mobile network (PLMN).

According to additional embodiments of the present invention, a mobile terminal may include a wireless modem, a wireless network interface, and a processor coupled to the wireless modem and to the wireless network interface. The wireless modem may be configured to provide a wireless data connection with a data network, and the wireless network interface may be configured to provide a wireless network data connection with at least one other mobile terminal. The processor may be configured to provide a first data path between the data network and an application (such as a browser application) running on the processor through the wireless modem, and to provide a second data path between the data network and a second mobile terminal through the wireless modem and the wireless network interface. The processor may be further configured to provide a third data path between the data network and a third mobile terminal through the wireless modem and the wireless network interface.

The mobile terminal may also include a memory coupled to the processor, and the memory may include a list of at least one permitted authentication. Moreover, the processor may be further configured to receive authentication information from the second mobile terminal through the wireless network interface, and to provide the second data path between the data network and the second mobile terminal if the authentication is successful. In the alternative, the processor may be configured to block the second data path between the data network and the second mobile terminal if the authentication is unsuccessful. The mobile terminal may include a user interface having at least one user input device, and the processor may be configured to accept a permitted authentication code provided through the user interface and to store the permitted authentication code in the memory.

More particularly, the mobile terminal may also include a memory coupled to the processor, and the memory may include a list of at least one permitted authentication code. Moreover, the processor may be further configured to receive an authentication code from the second mobile terminal through the wireless network interface, and to provide the second data path between the data network and the second mobile terminal if the authentication code matches one of the list of at least one permitted authentication code. In the alternative, the processor may be configured to block the second data path between the data network and the second mobile terminal if the authentication code does not match any of the list of at least one permitted authentication code. The mobile terminal may include a user interface having at least one user input device, and the processor may be configured to accept a permitted authentication code provided through the user interface and to store the permitted authentication code in the memory.

The first and second data paths may be provided at the same time, and the data network may be the Internet. Moreover, the wireless network interface may be a wireless local network interface, and the wireless local network interface may operate according to at least one of a WiFi standard, a Bluetooth standard, a radio frequency identification (RFID) standard, a ZigBee standard, and/or a WiMax standard.

The wireless modem may provide a data connection with the data network using a public land mobile network (PLMN), and the wireless modem may provides the data connection using the public land mobile network according to at least one of a Global System For Communications (GSM), an Enhanced Data GSM Environment (EDGE) standard, a General Packet Radio Service (GPRS) standard, a Universal Mobile (UMTS) standard, a High Speed Downlink Packet Access (HSDPA) standard, a Code Division Multiple Access (CDMA) standard, a 1x Evolution Data Optimized (1xE-VDO) standard, a WiFi standard, an Ultra Wide-Band standard, a WiMax standard, and/or a Wide-Band Code Division Multiple Access (WCDMA) standard. More generally, the wireless modem may provide the data connection using the public land mobile network and a packet switched connection and/or a circuit switched connection. In addition, the processor may be configured to provide a voice radiotelephone communication using the public land mobile network (PLMN).

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods or devices. Accordingly, the present invention may take the form of a hardware embodiment, a software embodiment or an embodiment combining software and hardware aspects. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

It will also be understood that although the terms first, second, etc. are used herein to describe various elements, these elements should not be limited by these terms. These terms are only used to distinguish one element or embodiment from another element or embodiment. Thus, a first element or embodiment could be termed a second element or embodiment, and similarly, a second element or embodiment may be termed a first element or embodiment without departing from the teachings of the present invention.

Figure 1:
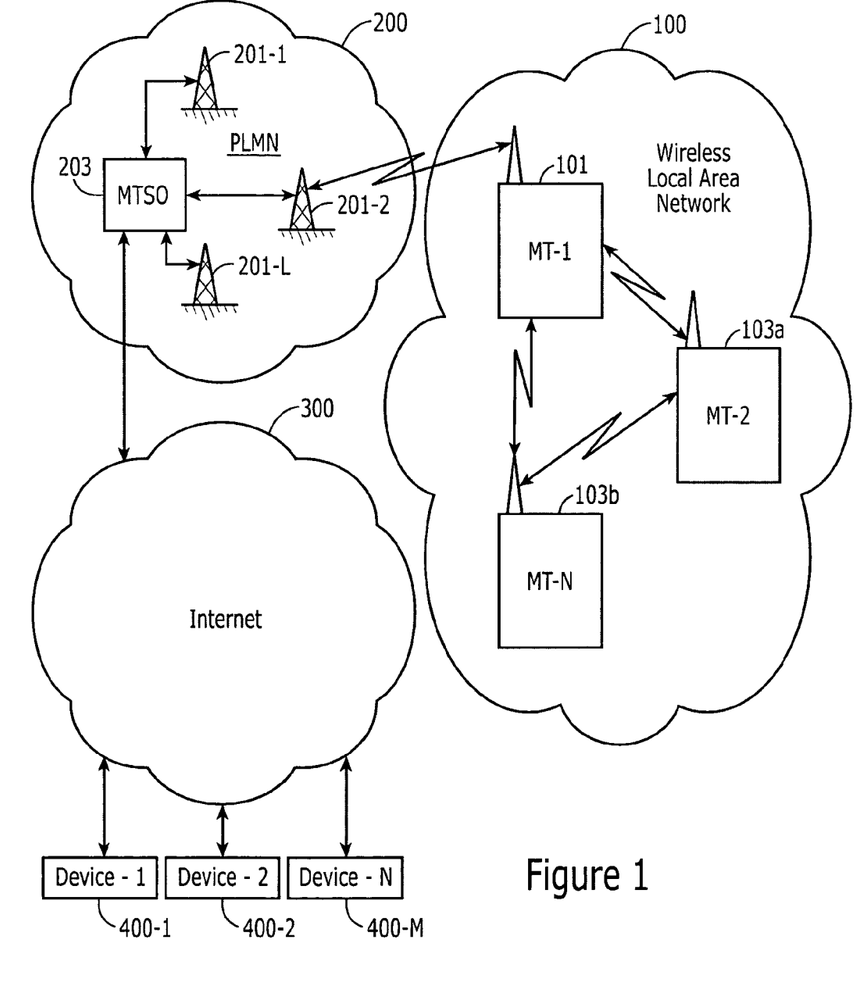
FIG. 1 is a block diagram illustrating communications systems and methods according to embodiments of the present invention.

FIG. 1 is a block diagram illustrating communications systems according to embodiments of the present invention. As shown in FIG. 1, a Public Land Mobile Network 200 may include a plurality of base stations 201-1 to 201-L and one or more Mobile Telephone Switching Offices (MTSOs) 203, and the Internet 300 may provide a coupling between the PLMN 200 and any number of data devices 400-1 to 400-M (such as servers). An appropriately enabled mobile terminal, such as mobile terminal 101, may thus access one or more of the data devices 400-1 to 400-M using a data path provided through the PLMN 200 and the Internet 300. More particularly, the data path between the mobile terminal 101 and one of the data devices 400-1 to 400-M may be provided through a base station 201-2 and an MTSO 203 of the PLMN.

The mobile terminal 101 may thus include a browser application, a PLMN transceiver, and a wireless modem to support an Internet Connection. The browser application may be a known browser such as Microsoft Internet Explorer and/or Netscape Navigator, and the PLMN transceiver and/or wireless modem may be provided according to a radiotelephone standard such as GSM, EDGE, GPRS, UMTS, HSDPA, CDMA, 1xEVDO, WiFi, Ultra Wide-Band, WiMax, and/or WCDMA. Accordingly, the mobile terminal 101, for example, may be a laptop computer, a notebook computer, a handheld computer, a personal digital assistant (PDA), and/or a smartphone radiotelephone that supports wireless internet browsing and possibly other functionalities. In any one of these mobile terminals, the functionality of a PLMN transceiver and/or wireless modem may be built in. In an alternative, a removable "card" such as an EDGE card may be provided using a compatible slot or connector of the mobile terminal to add the functionality of a PLMN transceiver and/or wireless modem thereto. For example, a Personal Computer Memory Card International Association (PCMCIA) slot of a notebook computer, a laptop computer, and/or a handheld computer may receive an EDGE card providing PLMN transceiver and/or wireless modem functionality. In alternatives, a Peripheral Component Interconnect (PCI) Express slot or a Mini Peripheral Component Interconnect (PCI) Express slot may receive a compatible card providing PLMN transceiver and/or wireless modem functionality. In other alternatives, PLMN transceiver and/or wireless modem functionality may be provided through a Universal Serial Bus (USB) connection. Accordingly, a mobile terminal may include a PC Card (such as a PC Card, an ExpressCard 34, an Express Card 54, and/or a Mini PCI Card) and/or a data modem (such as a custom embedded and plug-in modem and/or module). A browser application and a wireless modem of a mobile terminal may be separated by a PC Card (such as a PC Card 16, a CardBus, a PCI Express, and/or a universal serial bus or USB) and/or a modem/module (such as a universal asynchronous receiver/transmitter UART, a universal serial bus USB, a serial peripheral interface SPI, and/or custom) interface.

The mobile terminal 101 may also include a wireless local area network interface transceiver that supports a wireless local area network 100 including the mobile terminal 101 and one- or more additional mobile terminals 103a-b. The wireless local area network interface transceiver, for example, may be provided according to the WiFi (IEEE 802.11) standard the Bluetooth standard operating in the Personal Area Network (PAN) mode, the radio frequency identification (RFID) standard, the ZigBee standard, and/or the WiMax standard. The Bluetooth standard is discussed, for example, by Sailesh Rathi in the reference entitled "*Blue Tooth Protocol Architecture*" from Dedicated Systems Magazine, 2000 Q4, pages 28-33, the disclosure of which is hereby incorporated herein in its entirety by reference. In another alternative, the wireless local area network may be provided using infrared couplings between the mobile terminals. Accordingly, data can be shared and/or transmitted between the mobile terminal 101 and other mobile terminals included in the wireless local area network 100.

The mobile terminals 101, 103a, and/or 103b of the wireless local area network need not be identical. For example, one of the mobile terminals may be a smartphone radiotelephone; another of the mobile terminals may be a laptop, a notebook, and/or a handheld computer; and/or still another of the mobile terminals may be a PDA. In an alternative, two or more of the mobile terminals 101, 103a, and/or 103b of the wireless local area network may be of a same type.

The mobile terminal 101 may thus provide a first data path between a data network such as the Internet 300 and the browser application of the mobile terminal 101 using a PLMN wireless modem of the mobile terminal 101. According to embodiments of the present invention, the mobile terminal 101 may also provide a second data path(s) between the data network (such as the Internet 300) and another mobile terminal 103a and/or 103b of the wireless local area network 100 using the PLMN wireless modem and the wireless local area network interface transceiver of the mobile terminal 101. The first and second data paths may be provided at the same and/or different times.

A single mobile terminal of a wireless local area network may thus support Internet access via a PLMN for other mobile terminals in the wireless local area network. For example, the mobile terminal 101 may be a smartphone providing both voice and data communication through PLMN 200, and the owner of the mobile terminal 101 may also own the mobile terminal 103a which may be a laptop computer. Moreover, the smartphone mobile terminal 101 and the laptop computer mobile terminal 103a may include compatible wireless network interface transceivers allowing networking therebetween. Accordingly, the smart phone mobile terminal 101 may provide a data path between the laptop computer mobile terminal 103a and the Internet 300 through the PLMN 200 even though the laptop computer mobile terminal 103a is not equipped for direct communication with the PLMN 200. In addition or in an alternative, another mobile terminal 103b such as a PDA may include a compatible wireless network interface transceiver, and a third data path may be provided between the Internet 300 and PDA mobile terminal 103b through the mobile terminal 101 and the PLMN 200.

Accordingly, wireless Internet access may be provided for a mobile terminal 103a and/or 103b using PLMN 200 even though the mobile terminal 103a and/or 103b is not configured for communication with the PLMN 200. A single subscription for a device configured for communication with the PLMN 200 may thus provide wireless Internet access for any number of other mobile terminals that are not configured to communicate with the PLMN.

Moreover, the mobile terminal 101 may include a list of at least one permitted authentication used to identify one or more other mobile terminals authorized to access the Internet 300 through mobile terminal 101. Prior to providing a data path from another mobile terminal 103a and/or 103b to the PLMN 200 and Internet 300, the mobile terminal 101 may receive authorization information from the other mobile terminal. If the authentication is successful, the mobile terminal 101 may provide the data path for the other mobile terminal 103a and/or 103b through the mobile terminal 101 to the PLMN 200. If the authentication is not successful, the mobile terminal 101 may block the data path for the other mobile terminal 103a and/or 103b.

More particularly, the mobile terminal 101 may include a list of at least one permitted authentication code used to identify one or more other mobile terminals authorized to access the Internet 300 through mobile terminal 101. Prior to providing a data path from another mobile terminal 103a and/or 103b to the PLMN 200 and Internet 300, the mobile terminal 101 may receive an authorization code from the other mobile terminal and compare the authorization code from the other mobile terminal with the list of at least one permitted authentication code. If the authentication code from the other mobile terminal matches one of the list of at least one permitted authentication code, the mobile terminal 101 may provide the data path for the other mobile terminal 103a and/or 103b through the mobile terminal 101 to the PLMN 200. If the authentication code from the other mobile terminal does not match one of the list of at least one permitted authentication code, the mobile terminal 101 may block the data path for the other mobile terminal 103a and/or 103b.

An owner of the mobile terminal 101, for example, may enter one or more passwords as permitted authentication codes through a user interface of the mobile terminal 101, and one of the entered passwords may be provided by one of the other mobile terminals 103a-b as a condition for accessing the Internet 300 through the mobile terminal 101. For example, one of the passwords may be programmed into memory of the mobile terminal 103a so that the password is provided by the mobile terminal 103a automatically when a wireless local area network connection is initiated between the mobile terminals 101 and 103a. In an alternative, a user of the mobile terminal 103a may be prompted to enter the password through a user interface of the mobile terminal 103a when a wireless local area network connection is initiated between the mobile terminals 101 and 103a. With a single password, multiple other mobile terminals 103a-b may be allowed access to the Internet 300 through mobile terminal 101 using the same password, and/or different passwords could be used for different mobile terminals or groups of mobile terminals. Access may thus be limited to users of other devices with knowledge of permitted passwords without limiting access to particular other devices.

In an alternative, an owner of the mobile terminal 101 may enter one or more identification sequences identifying other mobile terminals as permitted authentication codes through a user interface of the mobile terminal 101, and one of the entered identification sequence may be provided by one of the other mobile terminals 103a-b as a condition for accessing the Internet 300 through the mobile terminal 101. For example, the identification sequences may be product serial numbers, electronic serial numbers, mobile serial number, or any other sequence (such as an alpha-numeric sequence) uniquely identifying the other mobile terminal 103a. The identification sequence may be provided by the other mobile terminal automatically when a wireless local area network connection is initiated between the mobile terminals 101 and 103a. Access may thus be limited to particular other devices without regard to a user of the particular other devices.

A PLMN data access account for the mobile terminal 101 may thus be shared with one or more permitted mobile terminals 103a-b in the wireless local area network 100. By requiring that the permitted mobile terminal 103a and/or 103b provided a permitted authentication code to the mobile terminal 101 before allowing Internet access through the mobile terminal 101, security for the mobile terminal 101 may be enhanced. Accordingly, a user of the mobile terminal 101 may limit Internet access through the mobile terminal 101 to specific other mobile terminals owned and/or used by "trusted" individuals (such as family members, relatives, co-workers, friends, etc.). Malicious access to the mobile terminal 101 may thus be reduced, and/or unauthorized use of a PLMN data access account for the mobile terminal 101 may be reduced.

Moreover, different levels of security may be provided for access to the mobile terminal 101 through the wireless local area network 100 and for access to the PLMN 200 and Internet 300 through the mobile terminal 101. For example, authentication and/or encryption may be provided according to the WiFi 802.11 standard for wireless data connections between the mobile terminals 101 and 103a-b. Separate authentication may be required as discussed above before access to the PLMN 200 and Internet 300 is allowed through the mobile terminal 101 for any of the other mobile terminals 103a-b in the wireless local area network 100. Accordingly, a mobile terminal 103a may be allowed into the wireless local area network 100 but blocked from access to the PLMN and Internet through the mobile terminal 101, while a mobile terminal 103b may be allowed into the wireless local area network 100 and also allowed to access the PLMN and Internet through the mobile terminal 101.

As shown in FIG. 1, any number of mobile terminals (such as mobile terminals MT-1 to MT-N) having compatible wireless network interfaces may form a wireless local area network 100 so that data can be shared between the mobile terminals in the wireless local area network 100. A single one of the mobile terminals 101 may thus be configured to provide a data path through the PLMN 200 to the Internet 300, and Internet access for other mobile terminals 103a-b in the wireless local area network 100 may be provided through the mobile terminal 101 and the PLMN 200. In an alternative, a subset of more than one of the mobile terminals of the wireless local area network 100 may be configured to provide a data path through the PLMN 200 to the Internet 300, and Internet access for other mobile terminals in the wireless local area network 100 may be provided through the subset of mobile terminals configured to provide a data path through the PLMN. In yet another alternative, a subset of more than one of the mobile terminals may be configured to provide a data path through the PLMN 200, but one mobile terminal of the subset may be selected to provide a data path through the PLMN for internet access for other mobile terminals in the wireless local area network.

Figure 2:
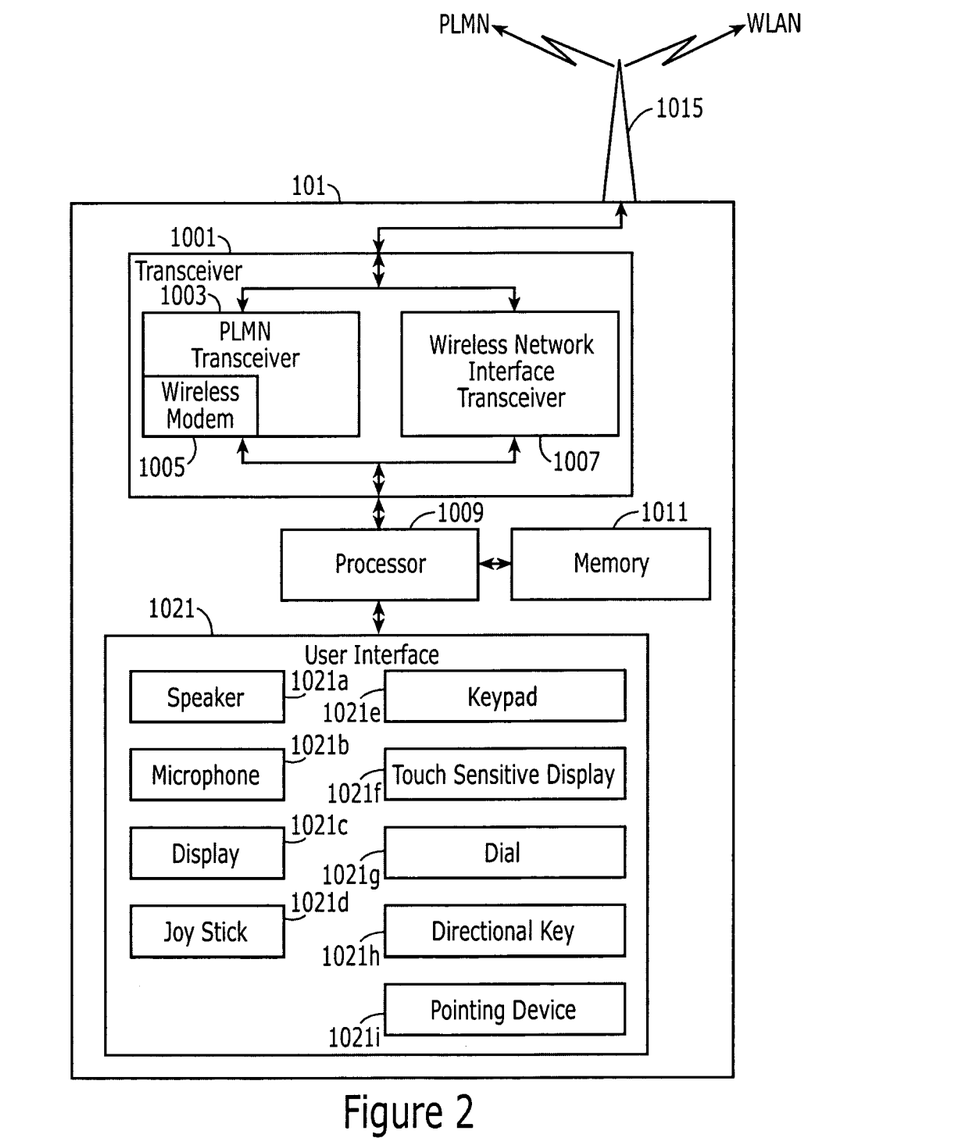
FIG. 2 is a block diagram of a mobile terminals and methods according to embodiments of the present invention.

Embodiments of the mobile terminal 101 will now be discussed in greater detail with reference to the block diagram of FIG. 2. As shown in FIG. 2, the mobile terminal may include processor 1009, memory 1011, user interface 1021, transceiver 1001, and antenna 1015. More particularly, the transceiver may include a wireless local area network interface transceiver 1007 (supporting the wireless local area network with other mobile terminals 103a-b) and a PLMN transceiver 1003 with a wireless modem 1005 (supporting a wireless data connection with the Internet 300 through the PLMN 200). If radiotelephone functionality is offered by the mobile terminal 101, the PLMN transceiver 1003 may also support voice radiotelephone communications provided through the PLMN 200. Depending on functionalities offered by the mobile terminal, the user interface 1021 may include a speaker 1021a, a microphone 1021b, a display 1021c (such as a liquid crystal display), a joy stick 1021d, a keypad 1021e, touch sensitive display 1021f, a dial 1021g, a directional key(s) 1021h, and/or a pointing device 1021i (such as a mouse, track ball, touch pad, etc.)

While a single antenna is illustrated in FIG. 2 by way of example, separate antennas may be provided for the PLMN transceiver 1003 and wireless network interface transceiver 1007, multiple antennas may be shared by the PLMN transceiver 1003 and wireless network interface transceiver 1007, and/or multiple antennas may be provided for one or both of the PLMN transceiver 1003 and wireless network interface transceiver 1007. While the memory 1011 is shown separate from the processor 1009, the memory 1011 or portions thereof may be considered as a part of the processor 1009. More generally, while particular functionalities are shown in particular blocks by way of illustration, functionalities of different blocks and/or portions thereof may be combined, divided, and/or eliminated. Moreover, particular elements of the user interface 1021 are shown by way of illustration only, and depending on the functionality of the mobile terminal 101, additional and/or fewer elements of the user interface may actually be provided. By way of example, a touch sensitive display 1021f may be provided in a PDA without a display 1021c, without a keypad 1021e, and/or without a pointing device 1021i. In an alternative, a speaker 1021a and a microphone 1021b may be included in a smartphone radiotelephone (providing voice radiotelephone communications), but one or both of the speaker and/or microphone may be eliminated in a laptop computer, a notebook computer, a handheld computer, and/or a PDA that does not provide voice radiotelephone communications.

The PLMN transceiver 1003 may support a broadband data connection with a PLMN 200 (such as a cellular radiotelephone network) according to a standard such as GSM EDGE, GPRS, UMTS, HSDPA, CDMA, 1xEVDO, WiFi, Ultra Wide-Band, WiMax, and/or WCDMA). More particularly, the PLMN transceiver 1003 may provide a broadband data connection from the processor 1009 through the PLMN transceiver 1003 and PLMN 200 to the Internet. Moreover, the processor 1009 may use a browser application (such as Microsoft Internet Explorer and/or Netscape Navigator) stored in memory 1011 to send data to and retrieve data from the Internet 300 through the PLMN transceiver 1003 and the PLMN 200 responsive to user input received through user interface 1021.

The wireless network interface transceiver 1007 may support wireless local area networking with other compatible mobile terminals according to a standard such as WiFi, Bluetooth, RFID, ZigBee, and/or WiMax. Accordingly, a wireless local area network 100 may be established with one or more other mobile terminals to allow data transfers therebetween. Network security for the wireless local area network (such as encryption and/or authentication) may be provided according to the applicable network standard being used, such as WiFi. The processor 1009 may thus receive data from and/or transfer data to other mobile terminals through the wireless network interface transceiver 1007 and antenna 1015.

Accordingly, the mobile terminal 101 can provide a first data path between the Internet 300 and a browser application from memory 1011 running on the processor 1009 through the PLMN transceiver 1003 including the wireless modem 1005 and the PLMN 200. The mobile terminal 101 can also provide a second data path between the Internet 300 and another mobile terminal (such as mobile terminal 103*a* and/or 103*b*) through the PLMN transceiver 1003 including the wireless modem 1005 and the wireless network interface transceiver 1007. As discussed above, a plurality of second data paths may be provided through the mobile terminal 101 for a plurality of other mobile terminals included in a wireless local area network with the mobile terminal 101. Moreover, first and second data paths may be provided at the same and/or different times.

The mobile terminal 101 may require that another mobile terminal provide a permitted authentication code before allowing the other mobile terminal access through mobile terminal 101 to the PLMN and Internet. For example, a list of at least one permitted authentication code used to identify one or more other mobile terminals authorized to access the Internet through mobile terminal 101 may be stored in memory 1011. Prior to providing a data path from another mobile terminal 103*a* and/or 103*b* to the PLMN and Internet, the mobile terminal 101 may receive an authorization code from the other mobile terminal through the wireless local area network interface transceiver 1007. The processor 1009 may then compare the received authentication code with the list of at least one permitted authentication code stored in memory 1011. If the authentication code received from the other mobile terminal matches one of the list of permitted authentication codes stored in memory 1011, the mobile terminal 101 may provide the data path for the other mobile terminal through the wireless local area network interface transceiver 1007 and the PLMN transceiver 1003 including the wireless modem 1005 to the PLMN. If the authentication code from the other mobile terminal does not match one of the list of permitted authentication codes stored in memory 1011, the processor 1009 of mobile terminal 101 may block the data path for the other mobile terminal through the PLMN transceiver 1003 including wireless modem 1005 to PLMN.

An owner of the mobile terminal 101, for example, may enter one or more passwords as permitted authentication codes through user interface 1021 into memory 1011, and one of the entered passwords may be provided by another mobile terminal as a condition for accessing the Internet 300 using the PLMN transceiver 1003 including wireless modem 1005. For example, one of the passwords may be programmed into memory of the other mobile terminal so that the password is provided by the other mobile terminal automatically when a wireless local area network connection is initiated between the mobile terminal 101 and the other mobile terminal using wireless local network interface transceiver 1007. In an alternative, a user of the other mobile terminal may be prompted to enter the password through a user interface of the other mobile terminal when a wireless local area network connection is initiated between the mobile terminal 101 and the other mobile terminal using the wireless local access network interface transceiver 1007. With a single password, multiple other mobile terminals may be allowed access to the Internet using the PLMN transceiver 1003 including wireless modem 1005 of mobile terminal 101 using the same password, and/or different passwords could be used for different other mobile terminals or groups of mobile terminals. Access may thus be limited to users of other devices with knowledge of permitted passwords without limiting access to particular other devices.

In an alternative, an owner of the mobile terminal 101 may enter one or more identification sequences identifying other mobile terminals as permitted authentication codes through user interface 1021 into memory 1011, and one of the entered identification sequence may be provided by another mobile terminal as a condition for accessing the Internet using PLMN transceiver 1003 including wireless modem 1005. For example, an identification sequence may be a product serial number, electronic serial number, mobile serial number, or any other sequence (such as an alpha-numeric sequence) uniquely identifying the other mobile terminal. The identification sequence may be provided by the other mobile terminal automatically when a wireless local area network connection is initiated with mobile terminals 101 using PLMN transceiver 1003 and wireless modem 1005. Access may thus be limited to particular other devices without regard to a user(s) of the particular other devices.

A PLMN data access account for the mobile terminal 101 may thus be shared with one or more other permitted mobile terminals coupled to the mobile terminal 101 using wireless local area network interface transceiver 1007. By requiring that the other permitted mobile terminal(s) provide a permitted authentication code to the mobile terminal 101 before allowing Internet access through the PLMN transceiver 1003 including wireless modem 1005, security for the mobile terminal 101 may be enhanced. Accordingly, a user of the mobile terminal 101 may limit Internet access through the mobile terminal 101 to specific other mobile terminals owned and/or used by "trusted" individuals (such as family members, relatives, co-workers, friends, etc.). Malicious access to the mobile terminal 101 may thus be reduced, and/or unauthorized use of a PLMN data access account for the mobile terminal 101 may be reduced.

Moreover, different levels of security may be provided for access to the mobile terminal 101 through the wireless local area network interface transceiver 1007 and for access by other mobile terminals to the PLMN and Internet through the PLMN transceiver 1003 including wireless modem 1005. For example, authentication and/or encryption may be provided according to a WiFi 802.11 standard for wireless data connections with other mobile terminals using wireless local area network interface transceiver 1007. Separate authentication may be required as discussed above before access to the PLMN is allowed through the PLMN transceiver 1003 including wireless modem 1005 for any other mobile terminals in a wireless local area network provided using wireless local area network interface transceiver 1007. Accordingly, a first other mobile terminal may be allowed access to the wireless local area network interface transceiver 1007 but blocked from access to the PLMN transceiver 1003, while a second other mobile terminal may be allowed access to the wireless local area network interface transceiver 1007 and also allowed to access the PLMN transceiver 1003.

The mobile terminal 101 may be a smartphone providing voice radiotelephone communications and broadband data communications, for example, to provide Internet access using a browser application. Accordingly, the PLMN transceiver 1003 including the wireless modem 1005 and the wireless local area network interface transceiver 1007 may be built into the smartphone mobile terminal. Moreover, the smartphone mobile terminal will include a speaker 1021*a* and a microphone 1021*b*, but a full blown alpha-numeric keyboard may be omitted.

In an alternative, the mobile terminal 101 may be a laptop computer, a notebook computer, a handheld computer, and/or a PDA. With a laptop computer, a notebook computer, a handheld computer, and/or a PDA, the PLMN transceiver 1003 including the wireless modem 1005 and/or the wireless local area network interface transceiver 1007 may be as a card inserted in a compatible slot of the mobile terminal (such as according to the PCMCIA standard, the PCI-Express standard, and/or the Mini PCI-Express standard). If voice communications are not provided, the speaker 1021*a* and/or microphone 1021*b* may be omitted from the mobile terminal 101. With a handheld computer and/or a PDA, a touch sensitive display 1021*f*, and a separate display and keypad may be omitted. Accordingly, a mobile terminal may include a PC Card (such as a PC Card, an ExpressCard 34, an Express Card 54, and/or a Mini PCI Card) and/or a data modem (such as a custom embedded and plug-in modem and/or module). A browser application and a wireless modem of a mobile terminal may be separated by a PC Card (such as a PC Card 16, a CardBus, a PCI Express, and/or a universal serial bus or USB) and/or a modem/module interface (such as a universal asynchronous receiver/transmitter UART, a universal serial bus USB, a serial peripheral interface SPI, and/or custom).

Other mobile terminals 103*a-b* may be provided as discussed above with respect to FIG. 2. Other mobile terminals, however, may omit the PLMN transceiver 1003 and wireless modem 1005. Another mobile terminal 103*a* and/or 103*b* without a PLMN transceiver 1003 may thus establish a wireless local area network with the mobile terminal 101, and Internet access for the other mobile terminal 103*a* and/or 103*b* may be provided using the PLMN transceiver 1003 including wireless modem 1005 of mobile terminal 101. Accordingly, a single PLMN transceiver 1003 and a single PLMN data access account may be used to provide broadband Internet access for a plurality of mobile terminals 101 and 103*a-b*. According to some embodiments of the present invention, PLMN data access may be provided indirectly for mobile terminals lacking a PLMN transceiver and/or modem. According to additional embodiments of the present invention, least cost routing may be provided such that PLMN data access is provided for a first networked mobile terminal through a second networked mobile terminal in the network even though the first networked mobile terminal provided direct PLMN data access. In other words, a plurality of mobile terminals in a network of mobile terminals may provide PLMN data access thereby creating a modem pool for the network, and a least cost rout may be selected for PLMN data access for the networked mobile terminals using one or more of the mobile terminals providing PLMN access.

In the drawings and specification, there have been disclosed typical preferred embodiments of the invention and, although specific terms are employed, they are used in a generic and descriptive sense only and not for purposes of limitation, the scope of the invention being set forth in the following claims. As used herein, the term "comprising" or "comprises" is open-ended, and includes one or more stated elements, steps, and/or functions. More particularly, it should be emphasized that the term "comprises/comprising" when used in this specification is taken to specify the presence of stated features, integers, steps or components but does not preclude the presence or addition of one or more other features, integers, steps, components or groups thereof.

That which is claimed is:

1. A method of operating a first mobile terminal including a wireless modem, a wireless network interface, and an application, the method comprising:
   providing a first data path between a data network and the application of the first mobile terminal through the wireless modem; and
   providing a second data path between the data network and a second mobile terminal through the wireless modem and the wireless network interface of the first mobile terminal wherein providing the second data path comprises,
       providing a list of permitted authentication code at the first mobile terminal,
       receiving authentication information from the second mobile terminal, and
       providing the second data path between the data network and the second mobile terminal if an authentication based on the list of permitted authentication code and the authentication information received from the second mobile terminal is successful.

2. A method according to claim 1 further comprising:
   providing a third data path between the data network and a third mobile terminal through the wireless modem and the wireless network interface of the first mobile terminal.

3. A method according to claim 1 further comprising:
   blocking the second data path between the data network and the second mobile terminal if the authentication is unsuccessful.

4. A method according to claim 1 wherein providing a list of permitted authentication code comprises accepting user entry of a permitted authentication code through a user interface of the first mobile terminal.

5. A method according to claim 1 wherein providing a list of permitted authentication code comprises storing the list of at least one permitted authentication code in memory of the first mobile terminal.

6. A method according to claim 1 wherein the data network comprises the Internet.

7. A method according to claim 1 wherein the wireless network interface comprises a wireless local network interface.

8. A method according to claim 7 wherein the wireless local network interface operates according to at least one of a WiFi standard, a Bluetooth standard, a radio frequency identification (RFID) standard, a ZigBee standard, and/or a WiMax standard.

9. A method according to claim 1 wherein the wireless modem provides a data connection with the data network using a public land mobile network (PLMN).

10. A method according to claim 9 wherein the wireless modem provides the data connection using the public land mobile network according to at least one of a Global System for Communications (GSM) standard, an Enhanced Data GSM Environment (EDGE) standard, a General Packet Radio Service (GPRS) standard, a Universal Mobile (UMTS) standard, a High Speed Downlink Packet Access (HSDPA)

standard, a Code Division Multiple Access (CDMA) standard, a 1x Evolution Data Optimized (1xEVDO) standard, a WiFi standard, an Ultra Wide-Band standard, a WiMax standard, and/or a Wide-Band Code Division Multiple Access (WCDMA) standard.

11. A method according to claim 9 wherein the wireless modem provides the data connection using the public land mobile network using a packet switched connection.

12. A method according to claim 9 wherein the wireless modem provides the data connection using the public land mobile network using a circuit switched connection.

13. A method according to claim 9 further comprising:
providing a voice radiotelephone communication using the public land mobile network (PLMN).

14. A method according to claim 1 wherein the first and second data paths are provided at the same time.

15. A mobile terminal comprising:
a wireless modem configured to provide a wireless data connection with a data network;
a wireless network interface configured to provide a wireless network data connection with at least one other mobile terminal;
a processor coupled to the wireless modem and to the wireless network interface, the processor being configured to provide a first data path between the data network and an application running on the processor through the wireless modem, and to provide a second data path between the data network and a second mobile terminal through the wireless modem and the wireless network interface; and
a memory coupled to the processor, the memory including a list of permitted authentication code, wherein the processor is further configured to receive authentication information from the second mobile terminal through the wireless network interface, and to provide the second data path between the data network and the second mobile terminal if an authentication based on the list of permitted authentication code and the authentication information received from the second mobile terminal is successful.

16. A mobile terminal according to claim 15 wherein the processor is further configured to provide a third data path between the data network and a third mobile terminal through the wireless modem and the wireless network interface.

17. A mobile terminal according to claim 15 wherein the processor is further configured to block the second data path between the data network and the second mobile terminal if the authentication is unsuccessful.

18. A mobile terminal according to claim 15 further comprising:
a user interface including at least one user input device; and
wherein the processor is further configured to accept a permitted authentication code provided through the user interface and to store the permitted authentication code in the memory.

19. A mobile terminal according to claim 15 wherein the data network comprises the Internet.

20. A mobile terminal according to claim 15 wherein the wireless network interface comprises a wireless local network interface.

21. A mobile terminal according to claim 20 wherein the wireless local network interface operates according to at least one of a WiFi standard, a Bluetooth standard, a radio frequency identification (RFID) standard, a ZigBee standard, and/or a WiMax standard.

22. A mobile terminal according to claim 15 wherein the wireless modem provides a data connection with the data network using a public land mobile network (PLMN).

23. A mobile terminal according to claim 22 wherein the wireless modem provides the data connection using the public land mobile network according to at least one of a Global System for Communications (GSM) standard, an Enhanced Data GSM Environment (EDGE) standard, a General Packet Radio Service (GPRS) standard, a Universal Mobile (UMTS) standard, a High Speed Downlink Packet Access (HSDPA) standard, a Code Division Multiple Access (CDMA) standard, a 1x Evolution Data Optimized (1xEVDO) standard, a WiFi standard, an Ultra Wide-Band standard, a WiMax standard, and/or a Wide-Band Code Division Multiple Access (WCDMA) standard.

24. A mobile terminal according to claim 22 wherein the wireless modem provides the data connection using the public land mobile network using a packet switched connection.

25. A mobile terminal according to claim 22 wherein the wireless modem provides the data connection using the public land mobile network using a circuit switched connection.

26. A mobile terminal according to claim 22 wherein the processor is further configured to provide a voice radiotelephone communication using the public land mobile network (PLMN).

27. A mobile terminal according to claim 15 wherein the first and second data paths are provided at the same time.

* * * * *

UNITED STATES PATENT AND TRADEMARK OFFICE
CERTIFICATE OF CORRECTION

PATENT NO. : 7,532,907 B2  Page 1 of 1
APPLICATION NO. : 11/199970
DATED : May 12, 2009
INVENTOR(S) : Louks et al.

It is certified that error appears in the above-identified patent and that said Letters Patent is hereby corrected as shown below:

In the Claims:
Column 12, Claim 5, Line 16: Please correct "of at least one permitted"
to read -- of permitted --

Signed and Sealed this

Fourth Day of August, 2009

JOHN DOLL
*Acting Director of the United States Patent and Trademark Office*